United States Patent
Piscitelli (10) Patent No.: US 12,247,881 B2
(45) Date of Patent: Mar. 11, 2025

(54) APPARATUS AND METHOD FOR MEASURING FAR-FIELD LUMINOUS INTENSITY AND COLOR CHARACTERISTICS OF LIGHT SOURCES

(71) Applicant: Sapphire IP, Inc., Pineville, NC (US)

(72) Inventor: Michael Piscitelli, Pineville, NC (US)

(73) Assignee: Sapphire IP, Inc., Pineville, NC (US)

( * ) Notice: Subject to any disclaimer, the term of this patent is extended or adjusted under 35 U.S.C. 154(b) by 189 days.

(21) Appl. No.: 17/171,458

(22) Filed: Feb. 9, 2021

(65) Prior Publication Data

US 2022/0065698 A1    Mar. 3, 2022

Related U.S. Application Data

(60) Provisional application No. 63/069,872, filed on Aug. 25, 2020.

(51) Int. Cl.
  *G01J 3/50*   (2006.01)
  *G01J 1/44*   (2006.01)
  *G02B 5/10*   (2006.01)

(52) U.S. Cl.
  CPC ............. *G01J 3/505* (2013.01); *G01J 1/44* (2013.01); *G02B 5/10* (2013.01)

(58) Field of Classification Search
  CPC . G01J 3/505; G01J 1/44; G01J 1/4257; G02B 5/10
  See application file for complete search history.

(56) References Cited

U.S. PATENT DOCUMENTS 4,226,530 A   10/1980   Broom
4,730,923 A   3/1988    Kosugi et al.
(Continued)

FOREIGN PATENT DOCUMENTS

JP   7234174 A     9/1995
KR   100315564 B1  2/2002

OTHER PUBLICATIONS

PCT International Search Report and Written Opinion cited in International Application No. PCTUS2021027594; Mailed Jul. 26, 2021; 12 pages.

(Continued)

*Primary Examiner* — Dominic J Bologna
*Assistant Examiner* — Mohamed Doumbia
(74) *Attorney, Agent, or Firm* — Shumaker, Loop & Kendrick, LLP; S. Alexander Long, Jr.

(57) ABSTRACT

An apparatus is provided for measuring far-field luminous intensity and color characteristics of a light source that includes a lamp test location for receiving a lamp for testing and a mirror positioned in a fixed light receiving position relative to the lamp test location and positioned in a fixed light transmitting position for reflecting a light beam from the lamp at a predetermined angle relative to the light receiving position. A measurement screen is positioned in a location relative to the mirror to receive the parabolically-condensed light image reflected from the mirror at the predetermined angle and a light detector is positioned to capture a light image reflected from the measurement screen. The light detector is configured to convert the reflected light image on the measurement screen to a digital signal and output the digital signal. A computer is configured for receiving and processing the digital signal corresponding to the reflected light image and calibrated for measuring luminous intensity according to an algorithm programmed in the computer.

22 Claims, 10 Drawing Sheets

(56) References Cited

U.S. PATENT DOCUMENTS

| | | | |
|---|---|---|---|
| 4,973,155 A | 11/1990 | Masuda | |
| 5,055,746 A * | 10/1991 | Hu | H05B 41/36 |
| | | | 315/106 |
| 5,078,490 A | 1/1992 | Oldweiler et al. | |
| 5,164,785 A | 11/1992 | Hopkins et al. | |
| 5,283,956 A | 2/1994 | Collot et al. | |
| 5,315,763 A | 5/1994 | Wing | |
| 5,331,393 A | 7/1994 | Hopkins et al. | |
| 5,373,357 A * | 12/1994 | Hopkins | G01M 11/064 |
| | | | 356/121 |
| 5,485,265 A * | 1/1996 | Hopkins | G01M 11/06 |
| | | | 356/121 |
| 5,751,832 A | 5/1998 | Panter et al. | |
| 5,752,321 A | 5/1998 | Schmitt et al. | |
| 5,778,544 A | 7/1998 | Pherigo | |
| 5,818,571 A * | 10/1998 | Prettyjohns | G01J 1/4257 |
| | | | 356/121 |
| 5,920,386 A | 7/1999 | Panter et al. | |
| 6,363,619 B1 | 4/2002 | Schirmer et al. | |
| 8,582,091 B2 | 11/2013 | Ekladyous et al. | |
| 8,605,269 B2 * | 12/2013 | Yotz | G01M 11/064 |
| | | | 382/104 |
| 8,928,869 B2 | 1/2015 | Ekladyous et al. | |
| 9,863,843 B2 | 1/2018 | Ekladyous et al. | |
| 9,885,630 B2 | 2/2018 | Wagner | |
| 9,970,752 B2 | 5/2018 | Foltin et al. | |
| 10,415,785 B2 | 9/2019 | Chen et al. | |
| 2002/0008868 A1 * | 1/2002 | Kubota | G01J 1/0411 |
| | | | 356/121 |
| 2013/0266034 A1 * | 10/2013 | Yu | H01S 5/12 |
| | | | 372/27 |
| 2014/0055779 A1 * | 2/2014 | Enami | G01J 1/4257 |
| | | | 356/121 |
| 2018/0003553 A1 | 1/2018 | Hammer et al. | |

OTHER PUBLICATIONS

Canadian Office Action issued on Aug. 29, 2023, in corresponding Canadian Patent Application No. 3,129,122 (5 pages).

Notice of Allowance, issued on Jan. 11, 2024, in corresponding Japanese App No. 2021-561605 (3 pages).

Notice of Allowance, issued on Jan. 6, 20242, in corresponding Chinese App No. 80002931.3 (2 pages).

Extended European Search Report dated Aug. 5, 2024, issued in European Application No. 21862256.1, 8 pages.

Office Action issued in corresponding Mexican Application No. MX/a/2021/010253, dated Aug. 28, 2024, 6 pages.

* cited by examiner

APPARATUS AND METHOD FOR MEASURING FAR-FIELD LUMINOUS INTENSITY AND COLOR CHARACTERISTICS OF LIGHT SOURCES

CROSS-REFERENCE TO RELATED APPLICATION

This application claims priority to and the benefit of U.S. Provisional Patent Application Ser. No. 63/069,872, filed Aug. 25, 2020, entitled "APPARATUS AND METHOD FOR MEASURING FAR-FIELD LUMINOUS INTENSITY AND COLOR CHARACTERISTICS OF LIGHT SOURCES" which is hereby incorporated herein in its entirety.

TECHNICAL FIELD AND BACKGROUND OF THE INVENTION

This application relates to a light measuring device and method using combinations of mirrors, screens, photometers, spectroradiometers, and/or scientific cameras to measure far-field luminous intensity and color characteristics of light sources. The apparatus and method are characterized by having an extremely reduced physical measuring distance compared to traditional methods. Additionally, the apparatus and method have high-resolution, high-accuracy, and fast measuring speeds that are not available with equipment available today.

The measurement of luminous intensity (the measure of the intensity of a light source in a particular direction in the units of candela) requires the light/lamp being tested to act as a "point source", and the measurement distance must be great enough to follow the "distance-squared law". Loosely defined, the "distance-squared law" states that as the measuring distance from the source to the detector increases, the illuminance in "lux" units measured at the detector will diminish by the square of the distance. The basic formula is "Illuminance=luminous intensity/distance$^2$". For the formula to work, the light source should be close to a "point source" such as a small light bulb or filament, and the distance should be at least 10 times as great as the diameter of the source.

In automotive and aerospace lighting, there are critical safety issues that take precedence over style, appearance and cosmetic considerations. Government regulations and industry standards are required to be met regarding a variety of technical factors. The direction, the color, and the intensity of various lamps must comply with these standards relating to illumination and/or signaling/marking. For example, vehicle headlamps project light on a road surface as well as in front of the vehicle to allow the driver to see obstacles and pedestrians. Parking lamps, tail lamps, and outline lamps allow other vehicles to determine the size, location, and general direction of travel of other vehicles on the road. Brake lamps and signal lamps signal other drivers that the vehicle plans to change direction or speed.

Similarly, aircraft navigation and lights variously referred to as anti-collision, beacon or strobe lights, allow pilots to judge the distance and direction of travel of other aircraft in the air and on the ground. Landing lights allow the pilot to see the runway, taxiway and obstacles ahead while providing forward-looking illumination of the aircraft to ramp workers, air traffic controllers and others. Airport ground lighting is used to guide pilots to safely land by giving indicators of the size, shape, and location of runways and taxiways, as well as guidance to maneuvering the aircraft safely on the ground during taxi and takeoff.

All of these types of lamps are traditionally tested on a "goniophotometer", a manual or automated positioning device for holding and moving the lamp being tested to various angular directions, combined with a device called a "photometer" that measures the luminous intensity of the light in those various angular directions. A "goniophotometer" is a variation of a goniometer, an instrument that either measures an angle or allows an object to be rotated to a precise angular position. Additionally, colorimeters and spectroradiometers can be added to the system to accurately measure the color characteristics of the lamp being tested. In order to fulfill the distance-squared law for basic signal lamps and other small lamps, the minimum test distance of a device approximately 12 inches in diameter according to prior art practices is approximately 10 times that value, or 10 feet.

For lamps that create a beam pattern, such as vehicle headlamps or aircraft landing lights, the minimum test distance might not only rely on the distance-squared law but also on making sure the measurement is taken at least as far away from the lamp as necessary for its pattern to be "combined" or "focused". In the United States, the requirements for testing headlamps dictate that the minimum testing distance shall be 60 feet. In most of the rest of the world, for example, regulations created by the United Nations Economic Commission for Europe (UN-ECE), the only allowed testing distance for headlamps is 25 meters (82 feet). Most lamp manufacturers are required to test the lamps they make at a frequency dictated by customer requirements, and these tests can be anywhere from 10-60 minutes per test at least. The photometry laboratories necessary to utilize a goniophotometer correctly can be very large, anywhere from 10-15 feet wide and most at minimum being 60 feet or even up to 100 feet long if testing retro-reflectors.

Therefore, there exists a need for a more compact, faster functioning and technically-advanced far-field photometer ("FFP") than is presently available.

SUMMARY OF THE INVENTION

Therefore, the novel FFP disclosed in this application measures the same luminous intensity and color characteristics as that of a full goniophotometer system, but within an extremely condensed physical footprint. The FFP uses one, or multiple, precision mirror(s) (parabolic, spherical or planar) to focus exiting light rays of a light source onto a diffuse screen. The newly formed image is then captured using a camera (CCD, CMOS, or other) that has been calibrated for measuring luminous intensity. Because convex/concave mirrors follow the same principles as conventional glass lenses, the size and shape of the mirrors can be manufactured to focus the image of the pattern of the light source as if it were at a particular distance in space. The curvature/shape of the mirror determines the focal length of the mirror "lens". The distance from the mirror to the measuring screen surface determines the "projected distance" of the lamp's pattern being measured.

Depending on the application, this novel FFP system can be configured to measure lamps for different purposes and applications. The simplest FFP system has a single lamp placed at the input of the system, aiming at the mirror and returning the measured pattern of that lamp. The field-of-view measured of the angular output of the lamp is determined by the distance of the lamp to the mirror, the size of the mirror itself, and the size of the measuring screen.

In order to increase the angular field of view measured, it is possible to add a goniometer, a positioning device from a goniophotometer, or even a simple turntable, to hold and move the lamp being tested. The image on the measurement screen corresponds to the same image as a stationary lamp as in the first application. However, by moving the lamp by exact angular amounts either in rotation, vertical tilt, or both, multiple images of various locations of the lamp can be captured and "stitched" together to create a much larger field of view of the output pattern of the lamp. Although the goniophotometer system performs a type of this function, the test distance is much greater and the single photometer used in most measuring applications would be like a single "pixel" of the camera, requiring thousands or millions of measurements to be taken to imitate what even a low resolution camera can take in a single exposure.

In a third application—aiming automotive headlamps as well as other types of lamps on a production line, the aiming process is currently performed using a relatively small Fresnel lens to condense the image of the lamp's pattern onto a small measuring screen. The screen is then imaged with a scientific camera and the image is used to determine the aiming parameters necessary to allow the driver to see properly. If the image shows the lamp is not aimed correctly, the operator can be shown on a screen, or with some type of visual or audible signal, which way to aim the lamp based on the image captured, or a computer-operated screwdriver can adjust the lamp automatically. There are limitations in the current systems used today. First, the Fresnel lens has a very poor "resolution" compared to a glass lens, and a glass lens large enough to capture the output of a headlamp would be cost prohibitive. Additionally, older headlamps were considered "point sources", as they were typically made using a small filament bulb. But modern headlamps utilizing LEDs and other technologies are sometimes extremely large, up to 15 inches or more in width in some cases. The existing aiming devices in the industry are too small to accept the outputs of these large lamps and have large errors due to the physics of the measurement not accepting the full angular output of the lamp.

In accordance with one embodiment of the invention an apparatus for measuring far-field luminous intensity and color characteristics of light sources is provided that includes a lamp test location for receiving a lamp for testing. A parabolic mirror is positioned in a fixed light receiving position relative to the lamp test location and is positioned in a fixed light transmitting position for reflecting a parabolically-condensed light beam at a predetermined angle relative to the light receiving position. A screen is positioned to receive the parabolically-condensed light image reflected from the parabolic mirror at the predetermined angle. A camera is positioned to capture the reflected light image from the screen, convert the reflected light image to a digital signal and output the digital signal. A computer is provided for receiving a signal from the camera corresponding to the reflected light image and calibrated for measuring luminous intensity according to an algorithm programmed in the computer.

In accordance with another aspect of the invention, an apparatus is provided for measuring far-field luminous intensity and color characteristics of a light source that includes a lamp test location for receiving a lamp for testing and a mirror positioned in a fixed light receiving position relative to the lamp test location and positioned in a fixed light transmitting position for reflecting a light beam from the lamp at a predetermined angle relative to the light receiving position. A measurement screen is positioned in a location relative to the mirror to receive the parabolically-condensed light image reflected from the mirror at the predetermined angle, and a light detector is positioned to capture a light image reflected from the measurement screen. The light detector is configured to convert the reflected light image on the measurement screen to a digital signal and output the digital signal. A computer is configured for receiving and processing the digital signal corresponding to the reflected light image and calibrated for measuring luminous intensity according to an algorithm programmed in the computer.

In accordance with another aspect of the invention, the mirror/screen/camera system is adapted to move relative to a stationary lamp, vehicle or the like when that suits the application. for example, when a vehicle is sitting on the production line, and light that is projected upwardly, as towards street signs/trees must be measured.

According to another aspect of the invention, a goniometer is provided for receiving the digital signal output from the camera.

According to another aspect of the invention, the lamp test location includes a lamp support positioned on a frame proximate the mirror.

According to another aspect of the invention, the lamp test location includes a location physically separate from the mirror and measurement screen.

According to another aspect of the invention, the mirror has a parabolic reflective surface positioned in a fixed light transmitting position for reflecting a parabolically-condensed light beam from the lamp to the measurement screen at a predetermined angle relative to the light receiving position.

According to another aspect of the invention, the lamp test location includes a vehicle positioned in a location proximate the mirror for projecting light onto the mirror.

According to another aspect of the invention, the mirror is positioned at an oblique angle relative to the measurement screen.

According to another aspect of the invention, the mirror is positioned at an angle of 66 degrees in relation to a horizontal plane defined by the angle at which the light beam is transmitted to the mirror.

According to another aspect of the invention, the measurement screen is positioned in a vertical orientation relative to the mirror.

According to another aspect of the invention, the measurement screen is positioned in an oblique angle relative to the mirror.

According to another aspect of the invention, the mirror and the measurement screen are each positioned at an oblique angle with reference to the horizontal plane defined by the angle at which the light beam is transmitted to the mirror.

According to another aspect of the invention, an apparatus is provided for measuring far-field luminous intensity and color characteristics of a light source and includes a lamp test location for receiving a lamp for testing and a mirror having a parabolic reflecting surface positioned in a fixed light receiving position relative to the lamp test location and positioned in a fixed light transmitting position for reflecting a light beam from the lamp at a predetermined angle relative to the light receiving position. A first measurement screen is positioned in a location to receive the parabolically-condensed light image reflected from the mirror at the predetermined angle, and a second measurement screen positioned in a location to receive the light image received by the first measurement screen. A camera is positioned to capture a light image reflected from the second measurement screen and is configured to convert the reflected light image on the second measurement screen to a digital signal and output the digital signal. A computer is configured for receiving and processing the digital signal corresponding to the reflected light image and calibrated for measuring luminous intensity according to an algorithm programmed in the computer.

According to another aspect of the invention, the first measurement screen is positioned at an oblique angle relative to the horizontal plane defined by the angle at which the light beam is transmitted to the mirror.

According to another aspect of the invention, the first measurement screen is positioned in a vertical orientation relative to the horizontal plane defined by the angle at which the light beam is transmitted to the mirror and the second measurement screen is positioned in a vertical orientation relative to the horizontal plane defined by the angle at which the light beam is transmitted to the mirror and parallel to the orientation of the first measurement screen.

According to another aspect of the invention, a method of measuring far-field luminous intensity and color characteristics of a light source is provided that includes the steps of positioning a lamp to be tested at a test location, projecting a light beam from the lamp onto a mirror positioned in a fixed light receiving position relative to the lamp test location and positioned in a fixed light reflecting position. The mirror is characterized by outputting a condensed light beam and reflecting the condensed light beam from the mirror onto a measurement screen. The light image is detected from the measurement screen and converted to a digital signal and output to a computer. The digital signal corresponding to the detected light image is calibrated for measuring luminous intensity according to an algorithm programmed in the computer.

According to another aspect of the invention, the method includes the steps of positioning the lamp in front of machine with an optical center of the lamp corresponding to a calibrated point in space from which all calculations are performed, powering the lamp to generate a projected light beam, stabilizing the light output of the lamp, and determining light luminance and light angularity based on predefined pass/fail criteria and intensity data and on system calibrations defined as part of the algorithm.

According to another aspect of the invention, the method includes the steps of determining a light transmission value from the mirror, a diffuse reflection light value from the measurement screen and a linearity value of light image detection from the measurement screen, and processing the light transmission value from the mirror, the diffuse reflection light value from the measurement screen and the linearity value of light image detection from the measurement screen to determine a luminance value in a single direction of the lamp.

According to another aspect of the invention, the method includes the steps of mapping a lamp for luminous intensity at a plurality of angular directions.

According to another aspect of the invention, the method includes the steps of providing a digital camera having a detector defined by an array of pixels to detect the light image reflected from the measurement screen wherein each pixel of the camera has a bit value that corresponds to the intensity of the light striking each pixel in the array of pixels, relating each pixel of the pixel array to an angular position in space and mapping the lamp's intensity at each angular position to calibrate each pixel to define for each pixel an intensity per pixel bit value.

According to another aspect of the invention, the method includes the steps of averaging the intensity per pixel bit value to correspond to a predetermined angular lamp position.

BRIEF DESCRIPTION OF THE DRAWINGS

The present invention is best understood when the following detailed description of the invention is read with reference to the accompanying drawings, in which.

DETAILED DESCRIPTION OF PREFERRED EMBODIMENT AND BEST MODE

Figure 1:
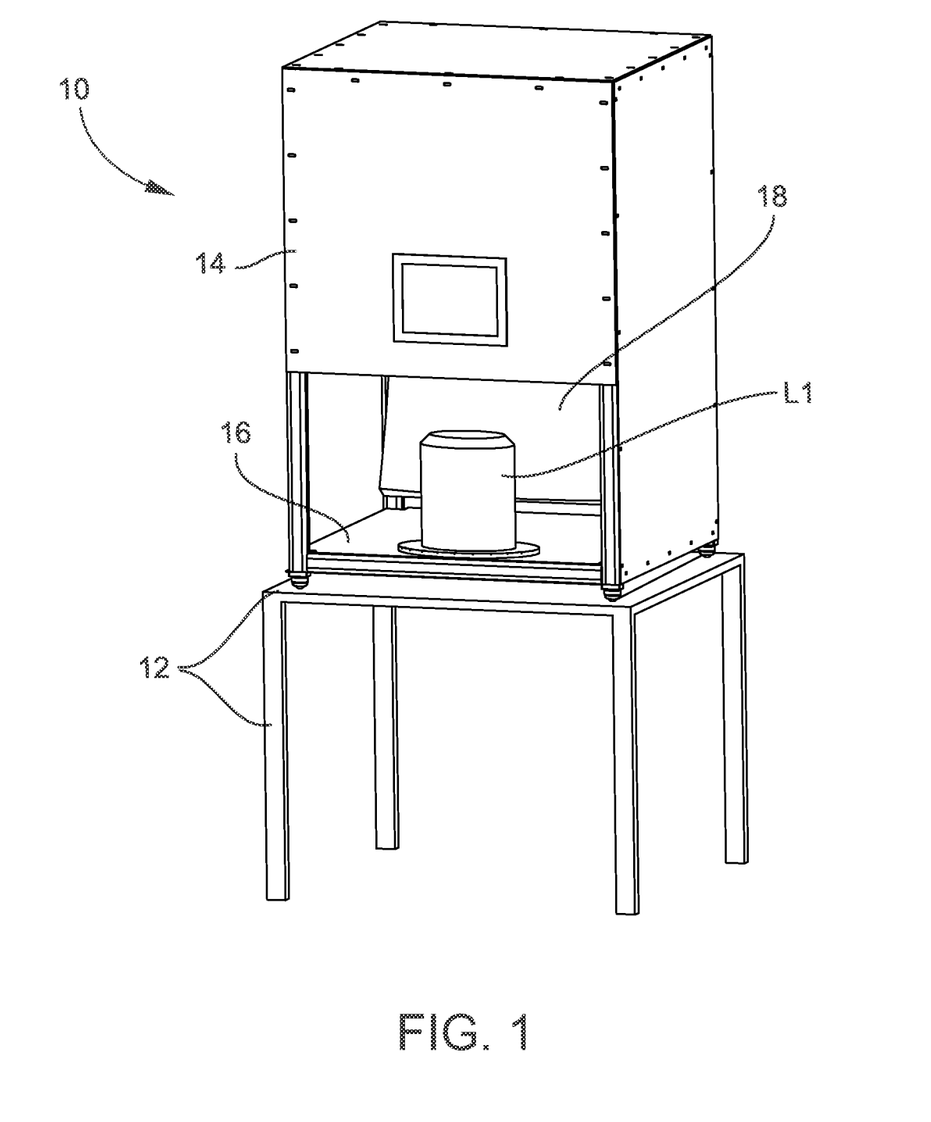
FIG. 1 is a perspective view of a desktop embodiment of a FFP according to a preferred embodiment of the invention.
Figure 2:
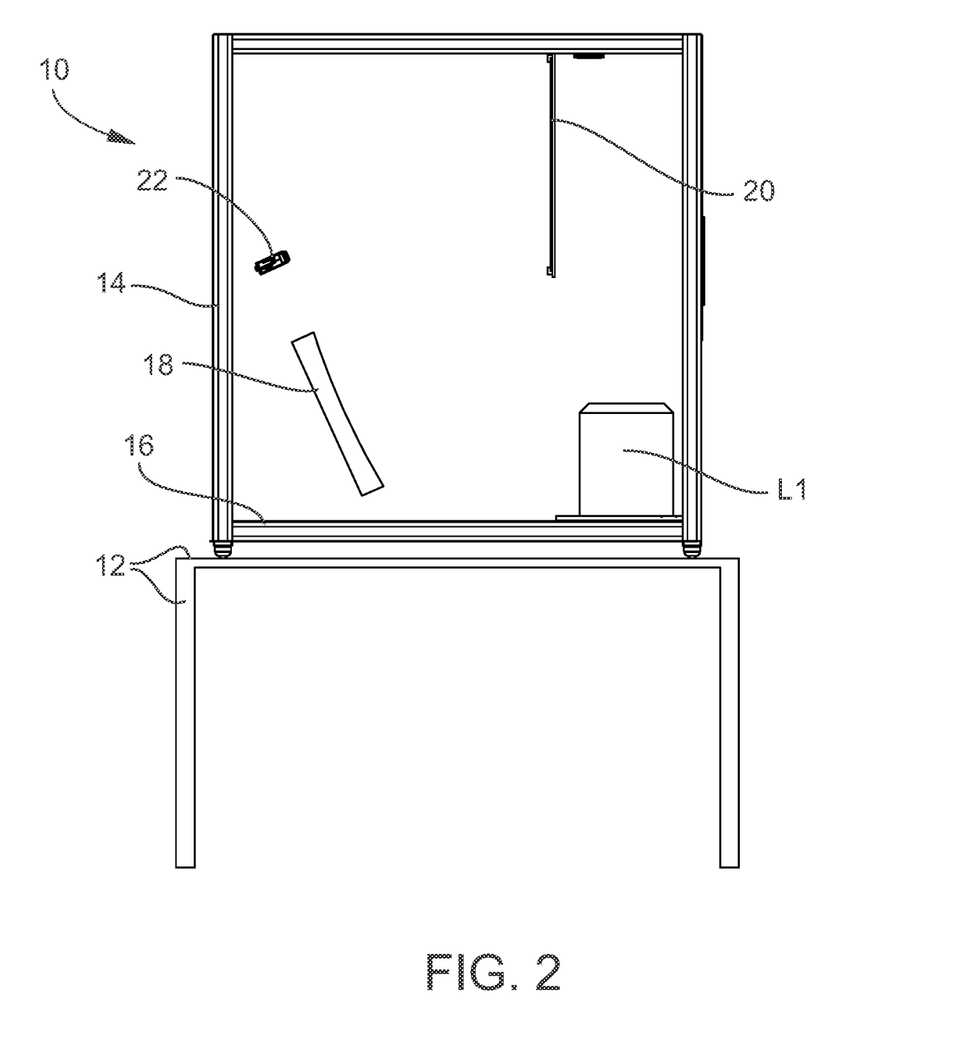
FIG. 2 is a side elevation of the desktop embodiment of the FFP shown in FIG. 1, configured to test an airport runway light.

Referring now to the drawings, an FFP apparatus for measuring far-field luminous intensity and color characteristics of light sources according to one preferred embodiment of the invention is shown in FIGS. 1 and 2 at broad reference numeral 10. The apparatus 10 includes a base 12 on which is mounted a frame 14. The frame 14 includes a horizontal test support 16 on which is shown an airport runway light "L1" positioned for being tested. A parabolic mirror 18 is mounted in light-receiving orientation on the test support 16. Light projected from the lamp "L1" onto the parabolic mirror 18 is parabolically condensed and reflected onto a measurement screen 20, FIG. 2, positioned at a light-receiving angle to the mirror 18 and above the lamp "L1". A camera 22 positioned above the mirror 18 captures the image projected by the mirror 18 onto the measurement screen 20. The camera 22 receives the image from the measurement screen 20 in analog form, converts the analog image to an analog signal, converts the analog signal to a digital signal in an A-to-D converter and transmits the digital image to a computer 54 for processing See FIGS. 4 and 5. The computer 54 is programmed with an algorithm that defines the technical requirements of a particular lamp being tested. The image received by the camera 22 and processed by the computer 54 results in an output value from which can be determined whether the lamp "L1" being tested meets the conditions of the algorithm. The computer 54 preferably includes random access memory for processing, digital storage, a monitor and outputs for transmitting the test results to a printer or to software for further processing and storage.

Figure 3:
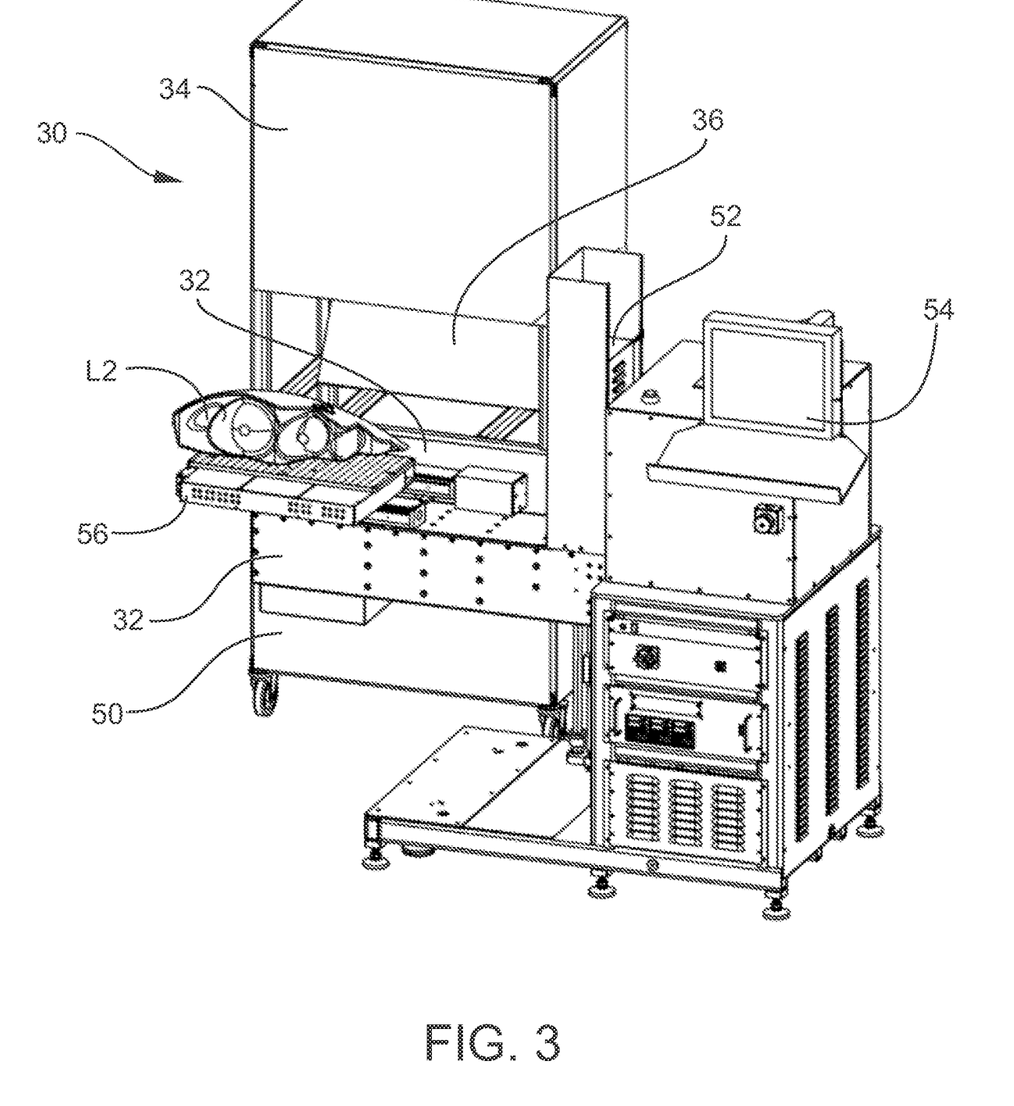
FIG. 3 is a perspective view of an embodiment of the FFP for testing a vehicle lamp.
Figure 4:
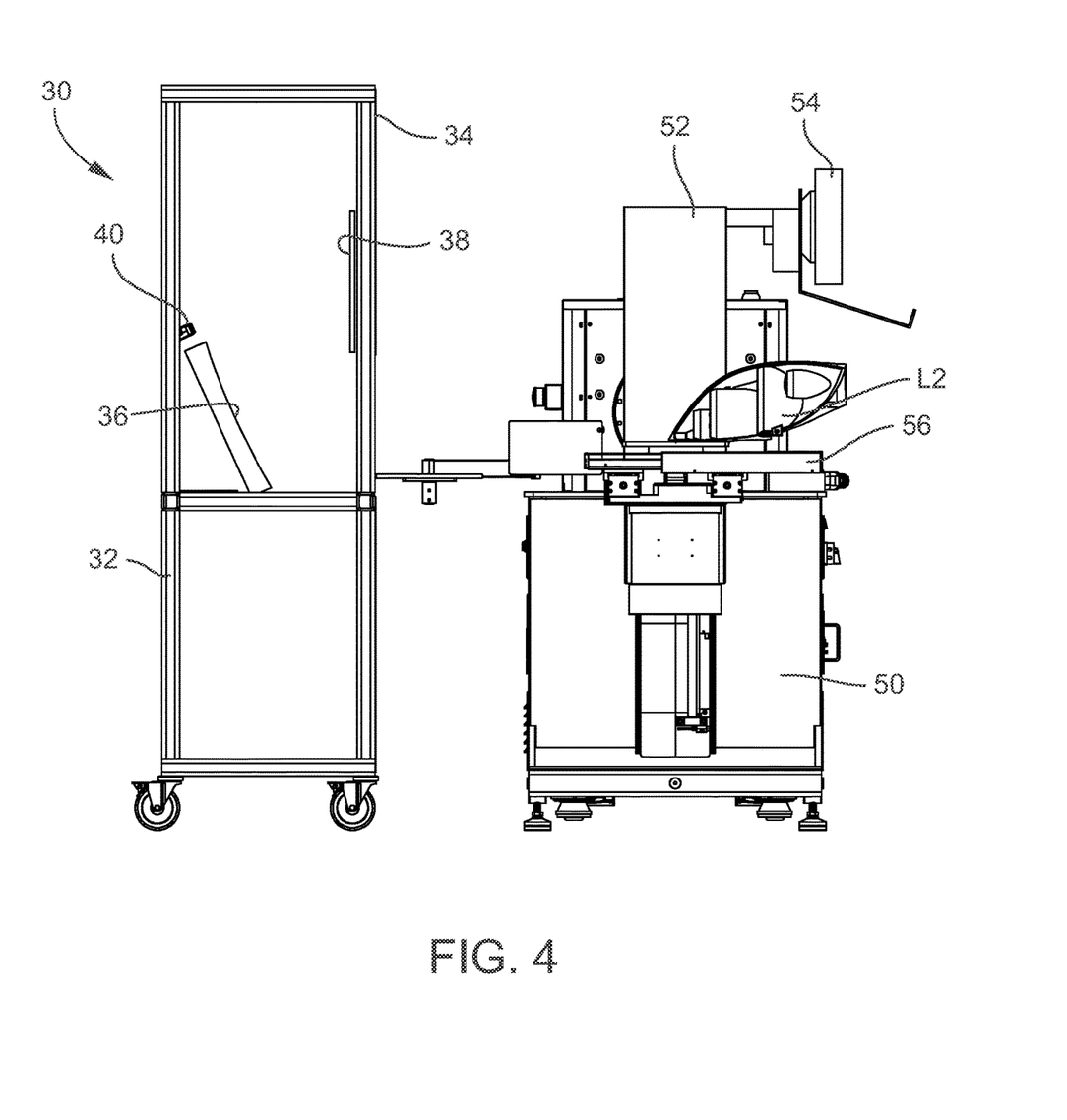
FIG. 4 is a side elevation of the embodiment of FIG. 3 showing a vehicle headlamp in a test position.

Referring now to FIGS. 3 and 4, an apparatus for measuring far-field luminous intensity and color characteristics of light sources according to an alternative preferred embodiment of the invention is shown at broad reference numeral 30. The apparatus 30 includes a base 32 on which is mounted a frame 34. As best shown in FIG. 4, a parabolic mirror 36 is mounted in light-receiving orientation on the frame 34. Light projected onto the parabolic mirror 36 is parabolically condensed and reflected onto a measuring screen 38 positioned at a light-receiving angle to the mirror 36. A camera 40 positioned above the mirror 36 captures the image projected by the mirror 36 onto the screen 38, and processes the image into digital data as described above.

A goniometer base 50 mounts a goniometer 52. The camera 40 transmits the image to a goniometer 52. The goniometer 52 interfaces with a computer 54 that is programmed with an algorithm that defines the technical requirements of a particular lamp being tested. The image received by the camera 40 outputs a digital signal representative of the light image and is processed by the computer 54 which results in an output value from which can be determined whether the lamp being tested meets the conditions of the algorithm. The computer 54 preferably includes random access processing memory, digital storage, a monitor and outputs for transmitting the test results to a printer or to software for further processing and storage.

As best indicated in FIG. 4, a vehicle headlamp "L2" is mounted on a test base 56 that is oriented and fixed at a precise distance and aimed at the parabolic mirror 36. As described above, light emitted from the vehicle headlamp "L2" is transmitted to the goniometer 52 and computer 54 for processing.

Figure 5:
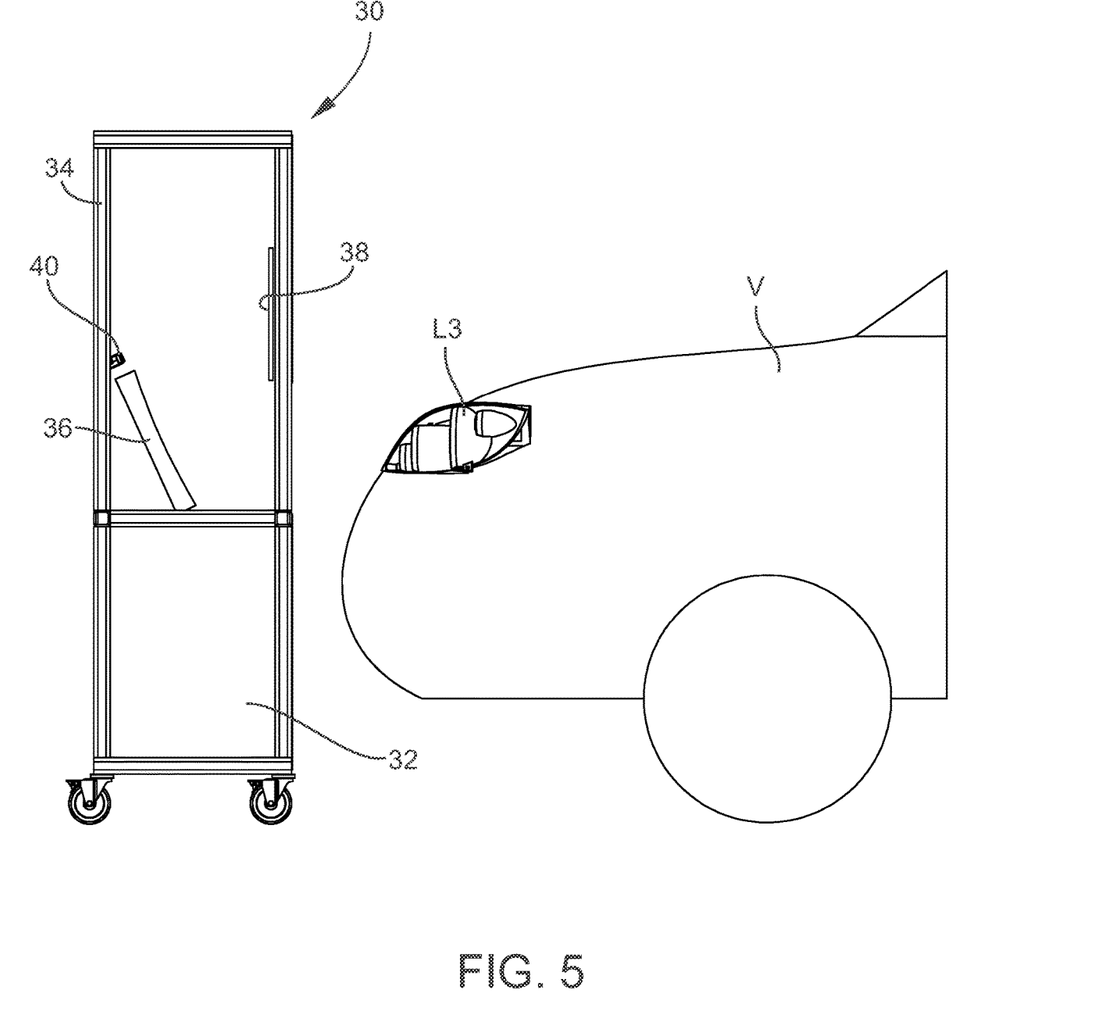
FIG. 5 is a side elevation of an FFP for testing a vehicle headlamp installed in a vehicle.

FIG. 5 shows an alternative arrangement whereby a vehicle headlamp "L3" has been installed in a vehicle "V". The lamp L3 is tested by positioning the vehicle "V" in a fixed location relative to the parabolic mirror 36, whereupon the test is carried out as described above.

Figure 6:
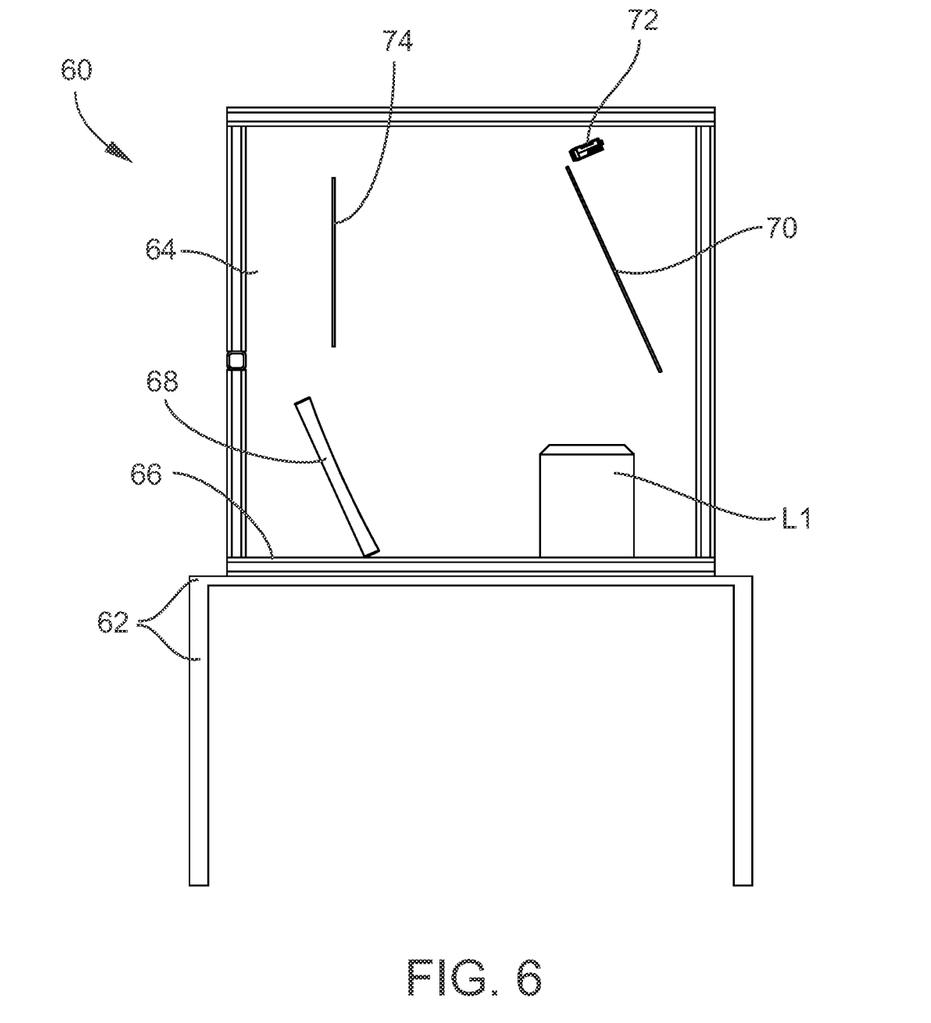
FIG. 6 is an alternative arrangement to that of FIGS. 1 and 2, showing a two-mirror system to assist in redirecting the light onto the screen.

FIG. 6 shows a further alternative arrangement. The apparatus 60 includes a base 62 on which is mounted a frame 64. The frame 64 includes a horizontal test support 66 on which is shown an airport runway lamp "L1" positioned for being tested. A parabolic mirror 18 is mounted in light-receiving orientation on the test support 66. Light projected from the lamp "L1" onto the parabolic mirror 68 is parabolically condensed and reflected onto a measurement screen 70. As shown in FIG. 6, a second, planar mirror 74 is positioned above the parabolic mirror 68 and in light-receiving relation to the measurement screen 70. A camera 72 positioned above the measurement screen 70 captures the image projected by the mirror 68 onto the measuring screen 70 and then received by the planar mirror 74. The planar mirror 74 transmits the light to the lens of the camera 72, shown positioned over the mirror measurement screen 70. The camera 72 receives the image from the planar mirror in analog form, converts the analog image to an analog signal, converts the analog signal to a digital signal in an A-to-D converter and transmits the digital image to the computer 54 for processing. See FIGS. 4 and 5. The computer 54 is programmed with an algorithm that defines the technical requirements of a particular lamp being tested. The image received by the camera 72 and processed by the computer 54 results in an output value from which can be determined whether the lamp "L1" being tested meets the conditions of the algorithm. The computer 54 preferably includes random access memory for processing, digital storage, a monitor and outputs for transmitting the test results to a printer or to software for further processing and storage.

Figure 7:
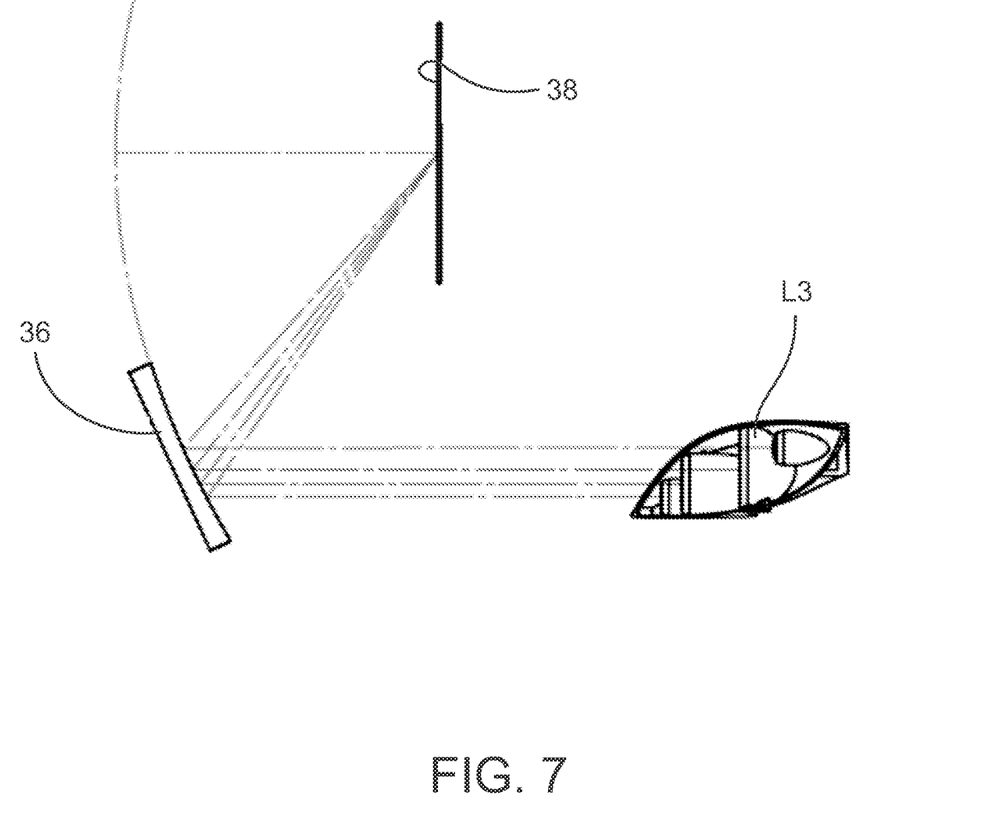
FIG. 7 is a simplified view of FIG. 2 indicating that the screen accepting the light is parallel to the mirror.

FIG. 7 is a simplified view of FIG. 4 indicating that the parabolic mirror 36 is positioned at an angle of 66 degrees in relation to the light being projected from the lamp L2, whereas the measurement screen 38 is positioned vertically and receives light projected onto it by the parabolic mirror 36 at an angle of 66 degrees.

Figure 8:
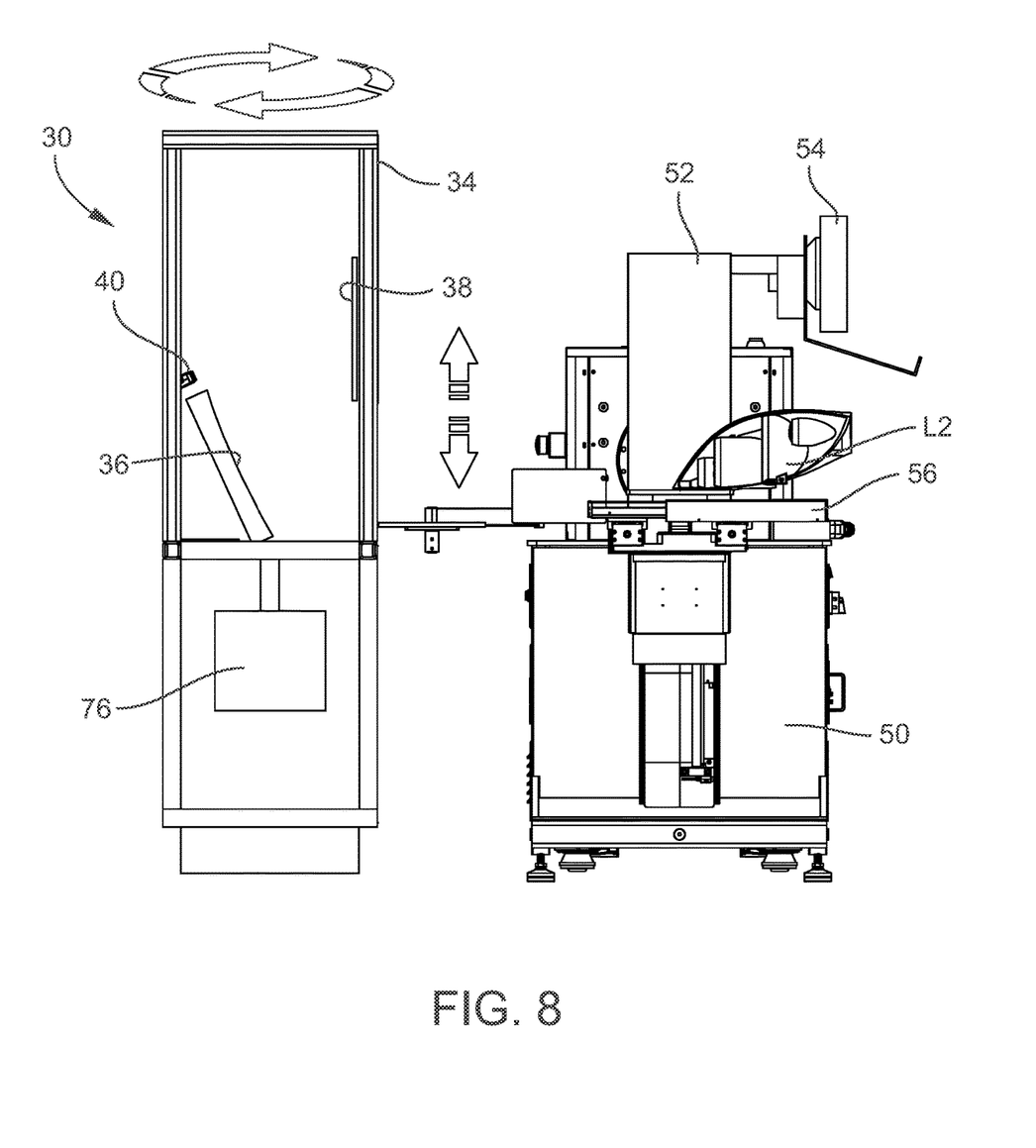
FIG. 8 is a schematic alternative arrangement showing the FFP mounted on a rotating lift for vertical and horizontal movement relative to a vehicle lamp.
Figure 9:
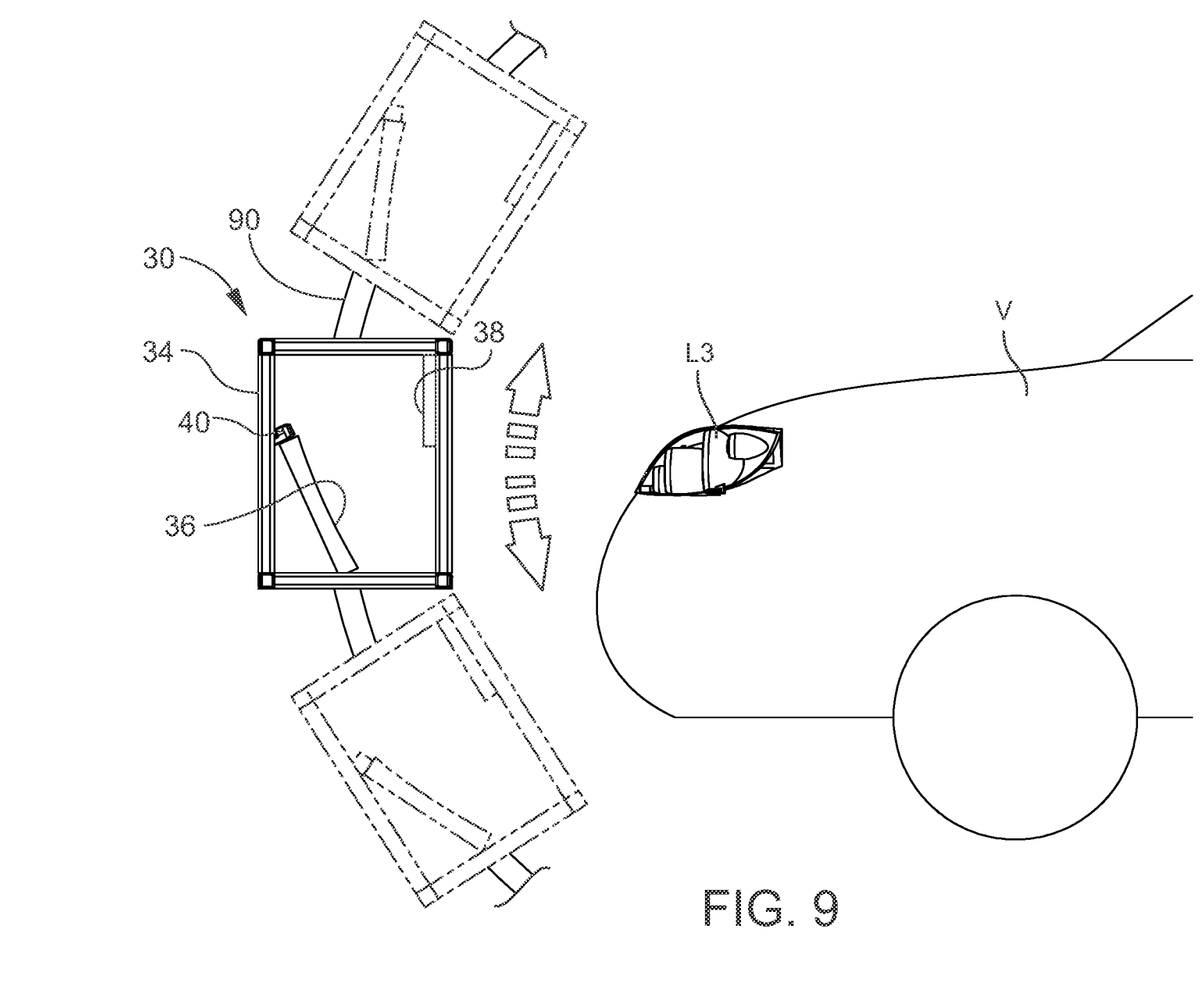
FIGS. 9 and 10 are schematic alternative arrangements showing the FFP mounted on a rail for vertical and horizontal arcuate movement relative to a vehicle lamp.
Figure 10:
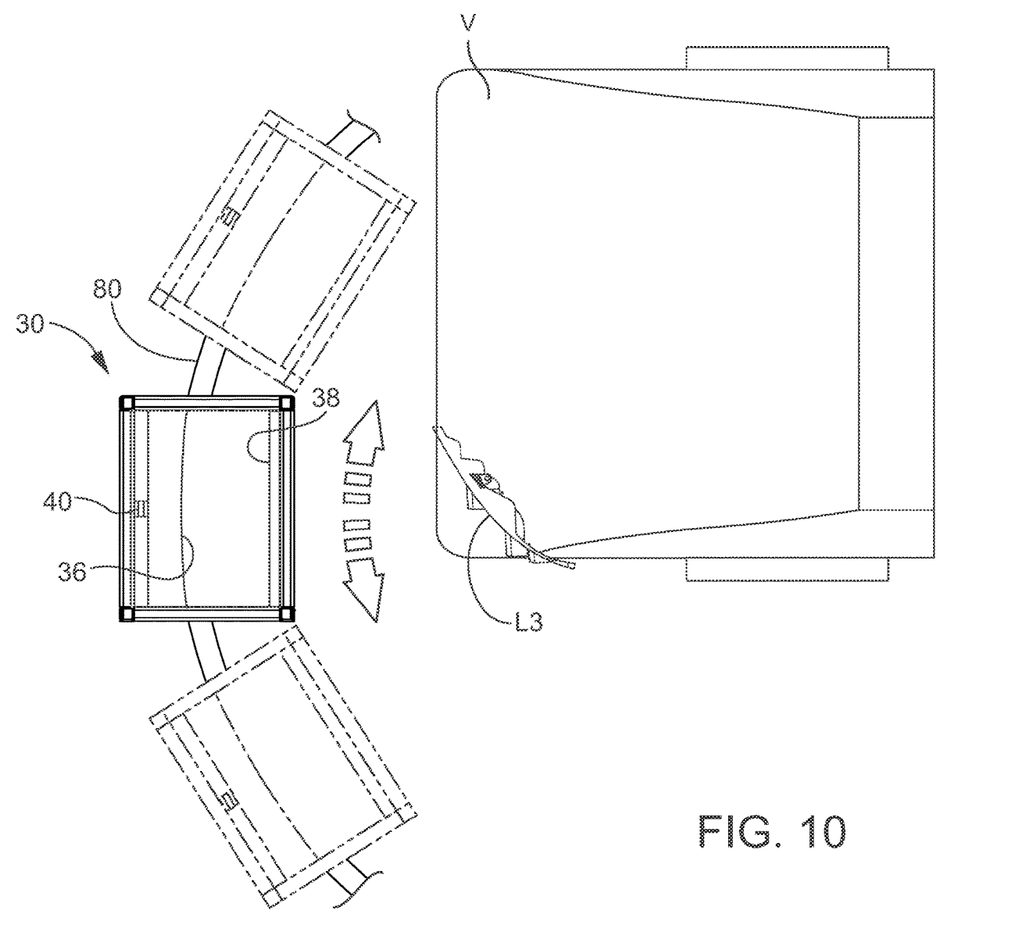

Referring to FIGS. 8, 9, and 10 there are situations where it is difficult or expensive to move the lamp, vehicle, or the like relative to a stationary apparatus, such as the apparatus 30 shown in FIGS. 3, 4 and 5. As shown in FIGS. 8 and 9, the apparatus 30 is mounted in a manner that permits it to move in a predetermined motion relative to the vehicle "V" and the lamp L3. While there are a wide range of mechanisms to accomplish this relative motion, by way of example the apparatus 30 in FIG. 8 is mounted on a lift that has a rotation capability. As shown in FIGS. 9 and 10 a rail 80 is provided on which the apparatus is mounted, and is moved in an arc relative to the lamp L3 under the control of computer 54. By way of example, the vehicle "V" sitting on the production line is projecting light from the headlamps in a single direction, but light being projected upwards towards street signs, trees bridge overheads and the like may also be required to be tested. Clearly, tilting the vehicle "V" into the desired orientation is non-trivial so instead the apparatus 30 is moved relative to the stationary vehicle "V". In FIG. 9 the rail 80 is oriented to move the apparatus 30 in a vertical arc. In FIG. 10, the apparatus 30 is moved in a horizontal arc around the stationary vehicle "V" on a horizontally-oriented rail 90. As noted, these motions are under the control of the computer 54.

Further details of the apparatus according to the invention are explained with reference to the embodiment of FIGS. 3, 4 and 5, but which apply equally to the embodiments of the other Figures, and the discussion above. The measurement screen 38 should be a diffuse surface with as close to a Lambertian distribution as possible for accurate measurements. The material can be selected based on the accuracy desired of the system, but it is important that the spectral reflectivity be as uniform as possible so that all colors desired to be measured are not attenuated, or at least are attenuated by an equal amount. If a color camera 40 is being used as the measuring device, then corrections can be made for some color variations, but if a monochrome camera 40 is being used the measurement screen 38 should be as spectrally neutral as required to produce correct results. A monochrome camera as the camera 40 cannot discern various pixel values for the color striking them, it only can determine the intensity of the light at each pixel.

Due to the concave parabolic mirror 36 acting as the primary 'lens' of the system, the image reflected off the mirror 36 will be distorted according to the parabolic shape. The shape of the measurement screen 38 may be a similar, but opposite (convex) shape, of a size calculated to be set for the correct field of view of measurement set at a distance that creates a focal distance from the parabolic mirror 36 to create the appropriate image. When the measurement screen 38 placed at a distance that is exactly at the focal distance of the parabolic mirror 36, then the image will be focused at infinity. By moving the measurement screen 38 closer to the parabolic mirror 36, other projected distances of the original image can be captured. The distance required between the measurement screen 38 the parabolic mirror 36 can be calibrated by using a projected image that is focused at the desired testing distance, and then aimed at the parabolic mirror 36. The measurement screen 38 is then moved to the position that brings the projected image into focus, now corresponding to the system being calibrated to capture luminous intensity as if it were measured on a goniophotometer with that testing distance.

As apparent from the Figures, the measurement screen 38 is preferably planar. However, a measurement screen alternatively may be curved to match the parabolic shape of the parabolic mirror. The system setup and adjustability are greatly simplified by using a planar measurement screen, however the projected image off the parabolic mirror will now be distorted. By using modern machine-vision computer tools, this distortion can be removed electronically in software. It is possible to measure the size of the projected image used to calibrate the measurement screen distance, and then in software determine the number of pixels per millimeter on the measurement screen. This then can be calculated into pixels per degree, which then allows the system to directly report intensity values based on angular positions per pixel location. Another unique technique for calibrating this system is to use a goniophotometer with a calibrated laser to project a laser spot through the primary lens and onto the measurement screen. By rotating the goniophotometer to exact angular locations, the software can then capture the image of the laser spot and determine the relative pixel location on the measurement screen. By mapping many angular directions, extreme distortion can then be removed by the software remapping and associating certain pixel locations to real world angular locations.

Other benefits of using a measurement screen include the ease of production, as well as allowing the field of view of the system to grow or shrink without having to reposition or change the. As long as the lamp, for example L2, being projected onto the parabolic mirror 36 is normal to the plane of the parabolic mirror's reflecting direction, then the lamp can be moved closer or further away from the parabolic mirror 36. The closer the lamp is to the parabolic mirror 36, the larger the field of view reflected. The parabolic mirror 36 and the measurement screen 38 can be made large enough to capture the necessary field of view desired of the system. Due to the parabolic nature of the mirror 36, a vertical or horizontal shift in a lamp's position relative to the normal position of the parabolic mirror 36 will not affect the measurement as the parabola reflects the light to the same focal location as long as there is no angular change in the lamp.

The system can be made using more than just one parabolic mirror 36 and one measurement screen 38, depending on the size constraints of the application. In the basic example of just a parabolic mirror 36 and a planar measurement screen 38, field of view of the system is determined by the size of the parabolic mirror 36 and measurement screen 38. It is possible to add additional mirrors and/or lenses, and redirect and/or resize the image to change the orientation and packaging of the apparatus to accommodate the application's constraints.

The importance of the mirror 36 being parabolic is that by selecting a virtual area of the parabola that is not in the center of the parabola, an off-axis reflecting parabolic mirror 36 can be made. If a lamp, for example, L2, is projected directly at the parabolic mirror 36 on a normal axis to the parabolic mirror 36, then its projection will focus at the focal distance of the parabolic mirror 36 but in a direction directly back at the lamp L2. By taking what would be a 4 foot round parabolic shape and only using a slice of the lower section of the parabolic mirror 36, the projected image will still be reflected towards the parabolic center of the mirror 36, but that location will now be above the light source projected at the parabolic mirror 36. This allows for placing the measurement screen 38 above or below the lamp L2, or using additional parabolic mirrors 36 to redirect the projected image to a location that is better suited for the application. The positioning of the measuring device, in this case camera 40, can be adjusted to have better visibility of the screen 38 without being in the path of the projected light.

In some applications, it may be cost efficient to use a standard spherical concave mirror 36, as long as its parameters meet the needs of the system. The main drawback is that the image cannot be projected off-axis, so there will be limitations to the positioning of the mirror 36 and screen 38 compared to the light source.

In the apparatus 30 the camera 40 and the software are interdependent. The camera 40 needs to be of significant quality, resolution, and dynamic range to meet the needs of the application. A scientific camera or machine vision camera is likely to be used to meet these requirements. The lens selected for the camera 40 should be free of defects and have a large enough aperture and field of view not to cause vignetting or other distortions that cannot be calibrated out digitally or electronically. It is important that the camera 40 be able to have its exposure rate precisely controlled, as well as not having automatic gain, or other such features that would impede the ability to calibrate the camera for measuring photometric and/or colorimetric quantities correctly. In some applications a planar mirror may be utilized rather than a parabolic mirror, with software being used to process the image reflected by the planar mirror to the screen 38.

Angular calibration of the system is performed by projecting an image or a series of images on the screen 38 with known angular values. The camera 40 is used to record these angular values and uses them to evaluate data sets during testing.

To calibrate the camera 40 for measuring luminous intensity in this application, a known source of light must be projected into the system. This reference source is preferably a scientific standard, but could also be a lamp representative of what the system will be measuring that has been measured previously on a goniophotometer. The calibration source should be projected in the proper direction. Intensity calibration is performed by positioning a calibrated light source in front of the machine opening at World Center and powering the light source using a calibrated power supply. The camera 40 then captures images at numerous exposure rates and allows the system to relate pixel value to illuminance. By "World Center" is meant the point in space from which all calculations are performed. When a user needs to calibrate the system or test a lamp, the lamp is attached to a fixture which will position the lamp's optical center at this point in space. In addition to positioning the optical center at this point, the fixture also ensures the lamp is rotationally positioned such that it is level and projected in the proper direction. If the system is known to have a uniform transmission through the mirror 36, the screen 38 is of uniform diffuse reflection, and the camera 40 is linear, then a measurement in a single direction of the calibrated source can be used to calibrate the system. If higher accuracy is required of the system, a calibration source can be mapped for its luminous intensity at numerous angular directions. The information can then be applied in the software to map the same calibration source. Each pixel of the camera 40 will have a bit value that corresponds to the intensity of the light striking that pixel. As the system has been calibrated to relate each pixel to an angular position in space, then the map of the calibration source's intensity at each angular position can be used to calibrate each pixel for intensity per pixel bit value. In some cases, it may be a benefit to combine or average the values of multiple pixels to correspond to an angular position. This would be calibrated in the same manner, but with the intensity of the corresponding angular positions of the source being combined/averaged and applied to the pixel bit values at that angular location.

Referring to FIG. 7, the mirror 36 has been cut to be of the shape of only a section of the parabola. This allows the parabolic mirror 36 to act as an "off-axis" parabolic mirror and therefore the reflected light from the lamp L3 returns to the virtual optical focal point of the parabola and allows the measurement screen 38 to be moved out of the light path of the lamp L3 being tested.

Data collection is accomplished by accurately positioning a lamp in front of machine opening so that the lamp's optical center corresponds to the calibrated World Center. A pre-defined test in the software is run. The pre-defined test is a script created by the user that instructs the system to power the lamp(s), control any necessary wait time(s) to stabilize/warm-up the lamps, which subtests to run, any calculations to perform, and similar functions. The pre-defined test will also record light intensity and calculate angular and intensity data based on system calibrations. The results are evaluated based on user-supplied criteria and displayed with an overall PASS/FAIL rating as well as PASS/FAIL evaluations for each sub-test. The test results enable the user to generate reports and/or industry standard *.IES files containing luminance and angular data. In addition to immediate use the data may be archived and used in the future.

The importance of not using automatic gain and to control the exposure rate is that the dynamic range of most CCD cameras is not enough to capture the patterns of various light sources at one set exposure rate. It is not desirable to adjust the iris of the camera 40 lens, which would then affect the intensity of the light in a mechanical way that would be difficult to calibrate for. It is possible to use ND (neutral density) filters to attenuate brighter light sources, but then the system is much slower as it must change the filter position possibly multiple times while combining multiple images to create one image. By adjusting the exposure rate, which is extremely accurately controlled by new cameras down to microseconds, then multiple exposures at different exposure rates can be taken, then combined very quickly to create a higher dynamic range image. This technique is common today in most smart phones and cameras as HDR mode (high-dynamic range mode). However, by precisely controlling the exposure rate, the pixel bit level of the calibration source and the lamp being tested can be correlated. If the light intensity for certain pixels or groups of pixels falls below a certain threshold, the exposure time can be made larger, therefore integrating more light. By correlating the measured calibration source's pixel bit levels at a certain exposure rate, then creating a correction factor for a different exposure rate, the correct luminous intensity can be calculated. As an example, if the calibration source is known to be 100 candela, and the pixel bit value is 32000 with an exposure rate of 100 microseconds, then an unknown lamp being measured requires the exposure rate to be 200 microseconds to achieve the same 32000 pixel bit value and the corresponding light output is 50 candela. In this case, the camera 40 chosen must be of a quality that has a linear pixel bit value output per the intensity striking each pixel.

An apparatus and method for measuring far-field luminous intensity and color characteristics of light sources according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. An apparatus for measuring far-field luminous intensity and color characteristics of a light source, the apparatus comprising:
   a frame, wherein the frame internally comprises:
      a horizontal lamp test location within the frame for receiving a lamp for testing, wherein the lamp is positioned at the lamp test location within the frame for reflecting a light beam from the lamp at a predetermined angle;
      a parabolic mirror positioned in a fixed light receiving position relative to the lamp test location and positioned in a fixed light transmitting position for reflecting the light beam from the lamp at a predetermined angle relative to the light receiving position;
      a measurement screen positioned in a location relative to the parabolic mirror to receive the parabolically-condensed light image reflected from the parabolic mirror at the predetermined angle;
      a camera positioned to capture a light image reflected from the measurement screen, the camera configured to convert the reflected light image on the measurement screen to a digital signal and output the digital signal; and
      a light detector configured for receiving and processing the digital signal corresponding to the reflected light image and calibrated for measuring luminous intensity according to an algorithm programmed by a computer.

2. An apparatus according to claim 1, and including a goniometer for receiving the digital signal output from the light detector.

3. An apparatus according to claim 1, wherein the frame is mounted on a base.

4. An apparatus according to claim 1, wherein the lamp test location comprises a location physically separate from the parabolic mirror and measurement screen within the frame.

5. An apparatus according to claim 1, wherein the parabolic mirror comprises a mirror having a parabolic reflective surface positioned in a fixed light transmitting position for reflecting a parabolically-condensed light beam from the lamp to the measurement screen at a predetermined angle relative to the light receiving position.

6. An apparatus according to claim 5, wherein a second lamp test location comprises a vehicle positioned in a location proximate the parabolic mirror and outside of the frame for projecting light onto the mirror.

7. An apparatus according to claim 5, wherein the parabolic mirror is positioned at an oblique angle relative to the measurement screen.

8. An apparatus according to claim 7, wherein the parabolic mirror is positioned at an angle of 66 degrees in relation to a horizontal plane defined by the angle at which the light beam is transmitted to the parabolic mirror.

9. An apparatus according to claim 7, wherein the measurement screen is positioned in a vertical orientation relative to the parabolic mirror.

10. An apparatus according to claim 7, wherein the measurement screen is positioned in an oblique angle relative to the parabolic mirror.

11. An apparatus according to claim 8 wherein the parabolic mirror and the measurement screen are each positioned at an oblique angle with reference to the horizontal plane defined by the angle at which the light beam is transmitted to the parabolic mirror.

12. An apparatus according to claim 1, wherein the apparatus is mounted for movement relative to the lamp.

13. An apparatus for measuring far-field luminous intensity and color characteristics of a light source, comprising:
 a frame, wherein the frame comprises a lamp test location positioned within the frame at a light transmitting position for reflecting a light beam from the lamp at the lamp test location positioned within the frame at a predetermined angle with respect to a light receiving position;
 a mirror having a parabolic reflecting surface positioned within the frame in the fixed light receiving position relative to the lamp test location for reflecting a light beam from the lamp at the predetermined angle relative to the light receiving position;
 a first measurement screen positioned within the frame in a location to receive the parabolically-condensed light image reflected from the mirror at the predetermined angle;
 a second measurement screen positioned within the frame in a location to receive the light image received by the first measurement screen;
 a camera positioned within the frame to capture a light image reflected from the second measurement screen, the camera configured to convert the reflected light image on the second measurement screen to a digital signal and output the digital signal; and
 a computer configured for receiving and processing the digital signal corresponding to the reflected light image and calibrated for measuring luminous intensity according to an algorithm programmed in the computer.

14. An apparatus according to claim 13, wherein the first measurement screen is positioned at an oblique angle relative to the horizontal plane defined by the angle at which the light beam is transmitted to the mirror.

15. An apparatus according to claim 13, wherein the first measurement screen is positioned in a vertical orientation relative to the horizontal plane defined by the angle at which the light beam is transmitted to the mirror and the second measurement screen is positioned in a vertical orientation relative to the horizontal plane defined by the angle at which the light beam is transmitted to the mirror and parallel to the orientation of the first measurement screen.

16. A method of measuring far-field luminous intensity and color characteristics of a light source, comprising the steps of:
 providing an apparatus having a frame, wherein a lamp test location, a parabolic mirror, and a measurement screen are housed within the frame;
 positioning a lamp to be tested upon the lamp test location within the frame and positioning the lamp for reflecting a light beam from the lamp at a predetermined angle with respect to a light receiving positon;
 projecting a condensed light beam from the lamp onto the parabolic mirror positioned in a fixed light reflecting position;
 reflecting the condensed light beam from the parabolic mirror at the predetermined angle onto the measurement screen;
 detecting a light image reflected from the measurement screen;
 converting the light image on the measurement screen to a digital signal;
 outputting the digital signal to a computer; and
 processing the digital signal corresponding to the reflected light image and calibrated for measuring luminous intensity according to an algorithm programmed in the computer.

17. A method according to claim 16, and including the steps of:
 positioning the lamp in front of the parabolic mirror with an optical center of the lamp corresponding to a calibrated point in space from which all calculations are performed;
 powering the lamp to generate a projected light beam;
 stabilizing the light output of the lamp; and
 determining light luminance and light angularity based on predefined pass/fail criteria and intensity data system calibrations defined as part of the algorithm.

18. A method according to claim 16, and including the steps of:
 determining a light transmission value from the parabolic mirror, a diffuse reflection light value from the measurement screen and a linearity value of light image detection from the measurement screen; and
 processing the light transmission value from the parabolic mirror, the diffuse reflection light value from the measurement screen and the linearity value of light image detection from the measurement screen to determine a luminance value in a single direction of the lamp.

19. A method according to claim 16, and including the steps of mapping a lamp for luminous intensity at a plurality of angular directions.

20. A method according to claim 18, and including the step of:
 providing a digital camera having a detector defined by an array of pixels to detect the light image reflected from the measurement screen wherein each pixel of the camera has a bit value that corresponds to the intensity of the light striking each pixel in the array of pixels;
 relating each pixel of the pixel array to an angular position in space;
 mapping the lamp's intensity at each angular position to calibrate each pixel to define for each pixel an intensity per pixel bit value.

21. A method according to claim 19, and including the step averaging the intensity per pixel bit value to correspond to a predetermined angular lamp position.

22. A method according to claim 16, and including the step of mounting the parabolic mirror for movement relative to the lamp.

* * * * *